June 30, 1964   E. SCHAAFF   3,139,554
ELECTRIC DISCHARGE TUBE WITH ACCURATELY SPACED ELECTRODES
Filed Nov. 3, 1961

INVENTOR
ERNST SCHAAFF
BY
AGENT 3,139,554
ELECTRIC DISCHARGE TUBE WITH ACCU-
RATELY SPACED ELECTRODES
Ernst Schaaff, Hamburg, Germany, assignor to North
American Philips Company, Inc., New York, N.Y., a
corporation of Delaware
Filed Nov. 3, 1961, Ser. No. 149,995
Claims priority, application Germany Dec. 7, 1960
11 Claims. (Cl. 313—250)

The invention relates to a method of assembling a disc tube for high frequencies with a high degree of dimensional accuracy and to an arrangement for obtaining the dimensional accuracy required for this method. Disc tubes having minute grid-to-cathode spacings have to be made within very small dimensional tolerances. In addition, the tubes have to be assembled and soldered in a vacuum since they must be evacuated and sealed in a vacuum-tight manner as a result of the soldering operation. These requirements provide serious difficulties to manufacturers.

In order to restrict at least the operations in a vacuum to a minimum, it is known to manufacture the tubes from a number of composite parts which are soldered to one another in a vacuum. One of the composite parts comprises the cathode and the part of the tube wall extending from the cathode securing plate to the cathode surface. The other part comprises one or several tubular wall portions between which are soldered the annular supports for the various grids. The grids supported by the annular members are correctly spaced with respect to one another. More difficult than the adjustment of the relative spacing of the grids and of the grid-to-anode spacing is the correct location of the control grid with respect to the cathode, since the spacing between these electrodes is materially smaller and hence more critical than the grid spacings.

For accurate adjustment of the distance between the tensioning frame of the control grid and the marginal surface of the wall of the cathode opposite this frame it is known to provide a spacing ring of plastic material. The tube parts then are pressed together to an extent such that the desired grid-to-cathode spacing is obtained. In this operation the grid wires are pressed into the plastic ring so as to deform it. The tube is then sealed in a vacuum-tight manner by soldering to one another two metal rings secured to the sides of the walls of the parts.

Apart from the fact that in this method of assembling the spacing is readily made too small by the use of an excessive pressure, the provision of the metal rings protruding from the tube for providing a vacuum-tight seal is unsatisfactory.

According to the invention, in a method of assembling with a high degree of dimensional accuracy a disc tube for high frequencies having a minute grid-to-cathode spacing and comprising prefabricated grid and cathode support members in fitting together said components spacers are provided in the cathode space between the grid ring opposite the cathode and a reference surface situated in the cathode space which determine the grid-to-cathode spacing, after which the seam remaining between the grid ring and the facing edge of the wall of the cathode space is sealed by soldering.

The spacers may be pins arranged on the grid ring or on a reference surface. By measuring the axial distance between the reference surface and the cathode surface, the distance between the grid and the reference surface required to maintain the desired grid-to-cathode spacing is determined prior to the assembly of the parts. The pins are then brought to the correct length by grinding.

The advantage of the method in accordance with the invention consists in that during the soldering operation the grid-to-cathode spacing is automatically maintained with a high degree of accuracy. There is no need for an accurately maintained applied pressure and for associated measurements. It is sufficient for the pins to be thrust with light pressure to the associated abutment surfaces. It may be considered as an additional advantage that the tube parts may directly be soldered to one another instead of indirectly with the aid of protruding metal rings. Finally the cathode surface may if desired project beyond the edge of the wall of the cathode space or be situated lower than this edge, according as is required by the construction.

In order that the invention may readily be carried into effect, one embodiment thereof will now be described, by way of example, with reference to the accompanying diagrammatic drawings, in which.

Figure 1:
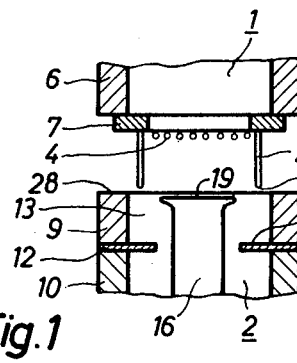
FIGURES 1 to 3 show parts of various modifications of composite tube parts used in final assembly of the tube.

In the method in accordance with the invention two component parts 1 and 2 of a disc tube are joined to one another. The part 1 comprises ceramic rings between which are soldered annular discs supporting the grids. At one end of this ring system is located a grid 4, the control grid, with respect to which all further grids are adjusted. For the sake of simplicity the figures show only the control grid 4 and an adjoining wall ring 6. The outer diameter of the annular disc 7 of the control grid 4 is smaller than that of the wall ring 6.

In the embodiment shown in FIGURE 1, the other component part 2 comprises two ceramic wall rings 9 and 10 between which is soldered an annular disc 12. The inner diameter of the annular disc 12 is smaller than that of the wall rings 9 and 10. Hence the annular disc 12 projects into a cathode space 13. One end of this ring system is closed by the ceramic plate 15 to the centre of which a cathode 16 is secured by soldering.

In the assembly of the tube the surface 17 of the annular disc 12 facing the aperture of the cathode space 13 serves as a reference surface. Prior to assembly the axial distance between this reference surface 17 and the cathode surface 19 is determined. This distance together with the desired grid-to-cathode spacing determines the distance by which the reference surface 17 and the grid surface 4 have to be spaced. In order to ensure that this spacing is maintained during assembly pins 21 are secured to the grid ring 7 which have a length corresponding exactly to the distance determined between the grid 4 and the reference surface 17. To avoid errors, the required length of these pins is determined individually in each tube, after which their real length is measured. When the length found differs from the length required, the necessary corrections are made by grinding ends 22 of the pins. However, the pins 21 are preferably first made longer than necessary and subsequently ground to the correct length.

Figure 2:
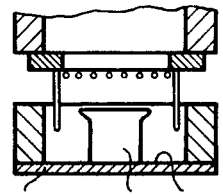

The pins 21 need not invariably co-operate with a special reference surface 17. The ceramic base plate 15 may also serve as the reference surface, as is shown in FIGURE 2. In the embodiment shown in FIGURE 3 the pins 21 are not secured to the grid ring 7 but to, a ledge 23 of a wall 24 of the cathode space 13, this ledge 23 acting as the reference surface 17.

The spacing pins 21 need not determine only the spacing between the grid 4 and the cathode surface 19. Alternatively, all the grids may be provided with such pins which either provided mutual support for two successive grids or project through the lower grids and are supported from at least one reference surface.

If not only the grid rings but also the reference surface consist of metal, the grid pins are made of ceramic material. If, however, at least one of the pin supports are made from ceramic material or another insulating material, metal pins are to be preferred.

Figure 3:
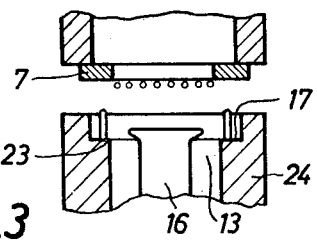
Figure 4:
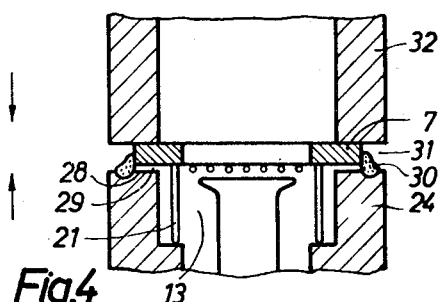
FIGURE 4 shows part of a tube after soldering.

When the component parts 1 and 2 are arranged one on top of the other according to arrows 26, the points 22 of the pins 21 engage the reference surface 17, as is shown in FIGURE 4, or the grid ring 7, as is shown in FIGURE 3.

The component parts 1 and 2 are urged together with a light pressure so that the points 22 are in satisfactory mechanical contact with the members they engage. Between the grid ring 7 and the edge 28 of the wall 24 of the cathode space 13 a seam 29 is left which should not be excessive in order to prevent solder from penetrating into the tube during the soldering operation; however, the seam should be wide enough to enable the spacing between the cathode and the grid surface to be varied by variation of the length of the pins.

Figure 5:
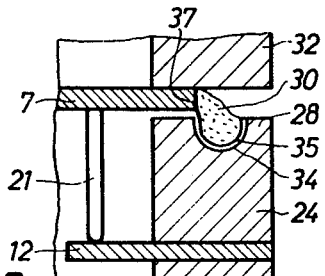
FIGURES 5 to 7 show various possible ways of soldering.

The solder 30 by which the component parts 1 and 2 are to be joined is introduced in the gap 31 between the ceramic wall parts 24 and 32. In order to prevent the solder from flowing off, in the embodiment shown in FIGURE 5 a groove 34 is provided the surface of which is coated with a metal layer 39. In the soldering operation, which is effected in a vacuum with the aid of a solder the melting point of which the lower than the melting point of the solder used for preceding soldering operations, the outer edge 37 of the grid 7 is joined to the metallized upper edge 28 of the wall 24 of the cathode space.

Figure 6:
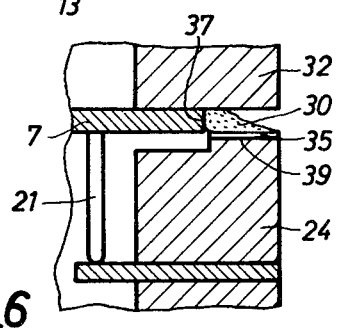
Figure 7:
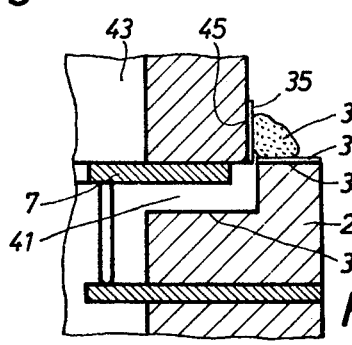

In the embodiment shown in FIGURE 6 the inner part of the edge 28 of the wall 24 of the cathode space is receessed opposite the grid ring 7. In this embodiment, soldering is performed between the protruding outer edge part 39, which is provided with a metal coating 35, and the outer metallized edge 37 of the grid ring 7. As is shown in FIGURE 7, the wall 24 of the cathode space 13 may have a larger outer diameter. In this case, a recessed edge part 38 extends through the common range of the grid ring 7 and the wall of the grid space 43. Thus the solder 30 joins the outer protruding edge 39, which is coated with a metal layer 35, of the wall 24 of the cathode space to a lower part, which is likewise coated with a metal layer 35, of the outer surface 45 of the grid space 43.

What is claimed is:

1. A method of assembling an electric discharge tube having a cathode and a control electrode in accurate spatial relationship comprising the steps, providing a reference surface on a cathode supporting member, providing projecting spacer members having a length corresponding to a predetermined cathode-to-control electrode spacing on a control electrode support member, pressing the cathode support member and the control electrode support member together with the spacer members engaging the reference surface on the cathode support member, the spacer members having a length at which a space is left between the cathode support member and the control electrode support member, introducing solder material into the space between the cathode support member and the control electrode support member, and heating the solder material to melt the same and seal the control electrode support member to the cathode support member.

2. A method of assembling an electric discharge tube having a cathode and a control electrode in accurate spatial relationship comprising the steps, providing a reference surface on a hollow member surrounding the cathode, providing projecting spacer members on a control electrode support member, adjusting the length of the spacer members to a predetermined cathode-to-control electrode spacing, pressing the hollow member and the control electrode support member together with the spacer members engaging the reference surface on the hollow member, the spacer members having a length at which a space is left between the cathode support member and the control electrode support member, introducing solder material into the space between the cathode support member and the control electrode support member, and heating the solder material to melt the same and seal the control electrode support member to the cathode support member.

3. A method of assembling an electric discharge tube having a cathode and a control electrode in accurate spatial relationship comprising the steps, providing a reference surface on a hollow cathode supporting member having a groove-shaped edge, providing projecting spacer members on a control electrode support member having a diameter smaller than that of said groove-shaped edge of said hollow cathode supporting member, adjusting the length of the spacer members to a predetermined cathode-to-control electrode spacing, pressing the cathode support member and the control electrode support member together with the spacer members engaging the reference surface on the cathode support member, the spacer members having a length at which a space is left between the groove-shaped edge at the cathode support member and the control electrode support member, introducing a solder material into the space between the cathode support member and the control electrode support member, and heating the solder material to melt the same and seal the control electrode support member to the cathode support member by joining the groove-shaped edge of the cathode support member to the edge of the control electrode support member.

4. A method of assembling an electric discharge tube having a cathode and a control electrode in accurate spatial relationship comprising the steps, providing a metallized reference surface on a hollow cathode supporting member, providing projecting ceramic spacer members on a metal control electrode support member, adjusting the length of the spacer members to a predetermined cathode-to-control electrode spacing, pressing the cathode support member and the control electrode support member together with the spacer members engaging the reference surface on the cathode support member, the spacer members having a length at which a space is left between the cathode support member and the control electrode support member, introducing solder material into the space between the cathode support member and the control electrode support member, and heating the solder material to melt the same and seal the control electrode support member to the cathode support member.

5. A method of assembling an electric discharge tube having a cathode and a control electrode in accurate spatial relationship comprising the steps, providing a reference surface on a hollow cathode supporting member, providing metal projecting spacer members on a control electrode support member, at least one of said reference surface and said control electrode support member being constituted of an insulating material, adjusting the length of the spacer members to a predetermined cathode-to-control electrode spacing, pressing the cathode support member and the control electrode support member together with the spacer members engaging the reference surface on the cathode support member, the spacer members having a length at which a space is left between the cathode support member and the control electrode support member, introducing solder material into the space between the cathode support member and the control electrode support member, and heating the solder material to melt the same and seal the control electrode support member to the cathode support member.

6. A method of assembling an electric discharge tube having a cathode and a control electrode in accurate spatial relationship comprising the steps, providing a reference surface on a hollow cathode supporting member, providing projecting spacer members on a control electrode support member, adjusting the length of the spacer members to a predetermined cathode-to-control electrode spacing, pressing the cathode support member and the control electrode support member together with the spacer members engaging the reference surface on the cathode support member, the spacer members having a length at which a space is left between the cathode support member and the control electrode support member, introducing solder material into the space between the cathode support member and the control electrode support member, and heating the solder material in vacuum to melt the same and seal the control electrode support member to the cathode support member.

7. A method of assembling an electric discharge tube having a cathode and a control electrode in accurate spatial relationship comprising the steps, providing a reference surface on a hollow cathode supporting member, providing projecting spacer members on a control electrode support member, grinding the ends of the spacer members to adjust the length thereof to a predetermined cathode-to-control electrode spacing, pressing the cathode support member and the control electrode support member together with the spacer members engaging the reference surface on the cathode support member, the spacer members having a length at which a space is left between the cathode support member and the control electrode support member, introducing solder material into the space between the cathode support member and the control electrode support member, and heating the solder material in vacuum to melt the same and seal the control electrode support member to the cathode support member.

8. A method of assembling an electric discharge tube having a cathode and a control electrode in accurate spatial relationship comprising the steps, providing a reference surface on a hollow cathode supporting member having a groove-shaped metallized edge, providing projecting insulating spacer members on a control electrode support member having a metallized edge having a diameter smaller than that of the recessed edge of the cathode supporting member, adjusting the length of the spacer members to a predetermined cathode-to-control electrode spacing, pressing the cathode support member and the control electrode support member together with the spacer members engaging the reference surface on the cathode support member, the spacer members having a length at which a space is left between the recessed edge of the cathode support member and the edge of the control electrode support member, introducing solder material into the space between the recessed edge of the cathode support member and the edge of the control electrode support member, and heating the solder material in vacuum to melt the same and seal the control electrode support member to the cathode support member.

9. An electric discharge tube comprising a cathode, a control electrode accurately spaced from said cathode, a hollow support for said cathode, an annular support member for said control electrode, a plurality of spacer members projecting from said support for said control member engaging a reference surface on the cathode support member and having a length at which the cathode is accurately spaced from the control electrode, and means sealing said control electrode member to the cathode support member.

10. An electric discharge tube as claimed in claim 9 in which the spacer members are constituted of an insulating material, the cathode support member and control electrode support member being constituted, at least in part, of metal.

11. An electric discharge tube as claimed in claim 9 in which the spacer members are constituted of metal, and one of the support members for the cathode and control electrode are constituted of insulating material.

References Cited in the file of this patent
UNITED STATES PATENTS

| | | |
|---|---|---|
| 1,991,174 | Rose | Feb. 12, 1935 |
| 2,887,606 | Diemer et al. | May 19, 1959 |